United States Patent
Jia et al.

(10) Patent No.: US 9,820,355 B2
(45) Date of Patent: Nov. 14, 2017

(54) ELECTRONIC DEVICE WITH DIRECTIONAL AMBIENT LIGHT SENSOR

(71) Applicant: Apple Inc., Cupertino, CA (US)

(72) Inventors: Zhang Jia, Santa Clara, CA (US); Giovanni Corradini, Prague (CZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/055,335

(22) Filed: Feb. 26, 2016

(65) Prior Publication Data
US 2016/0309564 A1 Oct. 20, 2016

Related U.S. Application Data

(60) Provisional application No. 62/148,302, filed on Apr. 16, 2015.

(51) Int. Cl.
*H05B 37/02* (2006.01)

(52) U.S. Cl.
CPC .......... *H05B 37/0218* (2013.01); *Y02B 20/46* (2013.01)

(58) Field of Classification Search
None
See application file for complete search history.

(56) References Cited

U.S. PATENT DOCUMENTS

| | | | |
|---|---|---|---|
| 4,441,791 A | 4/1984 | Hornbeck | |
| 6,040,937 A | 3/2000 | Miles | |
| 8,076,628 B2 | 12/2011 | Mahowald | |
| 2010/0283998 A1* | 11/2010 | Souchkov | G01J 1/02 356/141.2 |
| 2013/0100097 A1 | 4/2013 | Martin | |
| 2013/0271438 A1 | 10/2013 | Aflatooni | |
| 2014/0085265 A1* | 3/2014 | Yin | G06F 1/1637 345/175 |
| 2015/0171231 A1* | 6/2015 | Zivkovic | H01L 27/14623 257/435 |

OTHER PUBLICATIONS

Newman, "A Method of Providing an Ambient Light Sensor for Hand Held Terminals" Motorola, 2005.

* cited by examiner

*Primary Examiner* — Jany Richardson
(74) *Attorney, Agent, or Firm* — Treyz Law Group, P.C.; G. Victor Treyz; Vineet Dixit

(57) ABSTRACT

An electronic device may be provided with a display mounted in a housing. A directional ambient light sensor may measure the intensity and direction of ambient light. The ambient light sensor may be mounted in alignment with a light sensor window formed in an inactive area of the display. The ambient light sensor may be formed from detectors on a semiconductor substrate. Incident light angle restriction structures may define openings for each detector. Each opening may be configured to allow light with a different range of angle of incidence values to be passed to a respective one of the detectors. The ranges of acceptance angle for adjacent detectors may overlap. A sensor may produce a diffuse light reading by processing ambient light data from a diffuse light detector and a directional light detector. The diffuse and directional light detectors may be formed on a common semiconductor substrate.

21 Claims, 12 Drawing Sheets

ELECTRONIC DEVICE WITH DIRECTIONAL AMBIENT LIGHT SENSOR

This application claims the benefit of provisional patent application No. 62/148,302, filed Apr. 16, 2015, which is hereby incorporated by reference herein its entirety.

BACKGROUND

This relates generally to electronic devices, and, more particularly, to light sensors for electronic devices.

Electronic devices such as laptop computers, cellular telephones, and other equipment are sometimes provided with light sensors. For example, ambient light sensors may be incorporated into a device to provide the device with information on current lighting conditions. Ambient light readings may be used in controlling the device. If, for example bright daylight conditions are detected, an electronic device may increase display brightness to compensate.

Ambient light sensors can sometimes produce erroneous readings. For example, it may not be possible for an ambient light sensor to discriminate between bright outdoor conditions and low-intensity directional indoor lighting. This may lead to inappropriate adjustments in screen brightness.

It would therefore be desirable to be able to provide improved sensors for electronic device such as improved ambient light sensors.

SUMMARY

An electronic device may be provided with a display mounted in a housing. A directional ambient light sensor may be mounted in the housing to make ambient light measurements. The directional ambient light sensor may, for example, measure the intensity and direction of incident ambient light to produce an intensity versus angle of incidence profile.

The ambient light sensor may be mounted in alignment with a light sensor window formed in an inactive area of the display. The ambient light sensor may be formed from detectors on a semiconductor substrate. Incident light angle restriction structures that are formed on the substrate may be used to define openings for each detector. Each opening may be configured to allow light with a different range of angle of incidence values to be passed to a respective one of the detectors. In this way, each detector may measure light that is directed towards the sensor from a different angle. The ranges of angles of incidence that are covered by adjacent detectors may overlap, thereby enhancing accuracy when processing data from the directional ambient light sensor to produce an intensity versus angle of incidence profile.

A directional ambient light sensor may have a pair of light detectors. A first of the light detectors may be a diffuse light ambient light detector that measures the presence of diffuse ambient light. A second of the light detectors may be a directional light ambient light detector that measures the presence of directional light. This type of directional ambient light sensor may produce a diffuse light reading by processing ambient light data from the diffuse light detector and the directional light detector. The diffuse and directional light detectors may be formed on a common semiconductor substrate.

Data from a directional ambient light sensor may be used in making adjustments to display brightness, may be used in adjusting shading, texture, and other visual effects for items being presented on a display, or may be used by an electronic device to take other suitable action.

DETAILED DESCRIPTION

Figure 1:
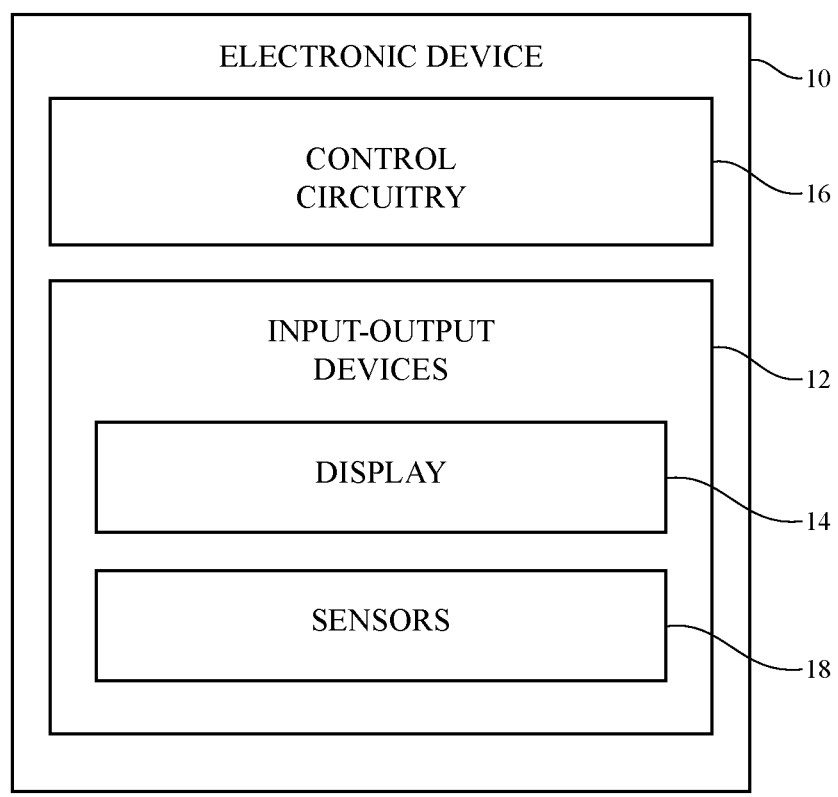
FIG. 1 is a schematic diagram of an illustrative electronic device having a light sensor in accordance with an embodiment.

An illustrative electronic device of the type that may be provided with one or more light sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include an ambient light sensor and other sensors (e.g., a capacitive proximity sensor, a light-based proximity sensor, a magnetic sensor, an accelerometer, a force sensor, a touch sensor, a temperature sensor, a pressure sensor, a compass, a microphone or other sound sensor, or other sensors). An ambient light sensor may have the ability to measure the direction of incoming light (i.e., sensors 18 may include a directional ambient light sensor that can measure light intensity as a function of angle of incidence). If desired a directional ambient light sensor may be used to discriminate between diffuse lighting conditions and non-diffuse lighting conditions (e.g., situations in which device 10 is being illuminated by a spot light source). Information on the quality of ambient light can be used in controlling display brightness (e.g., display brightness can be increased when it is determined that a spot light source is reflecting off of the surface of display 14 towards a viewer and/or can be decreased when it is determined that glare is reflected away from a user), can be used in adjusting shading, texture, or other on-screen effects for objects on display 14, can be used in otherwise rendering electronic content on display 14 (e.g., adjusting the way in which electronic content such as text, graphics, animation, video, images, and other content is displayed), or can be used in controlling other device functions during the operation of device 10. If desired, information from other sensors (e.g., an orientation sensor, a camera, etc.) may be used in combination with information from the ambient light sensor (e.g., to determine how device 10 is oriented relative to the viewer, etc.).

Figure 2:
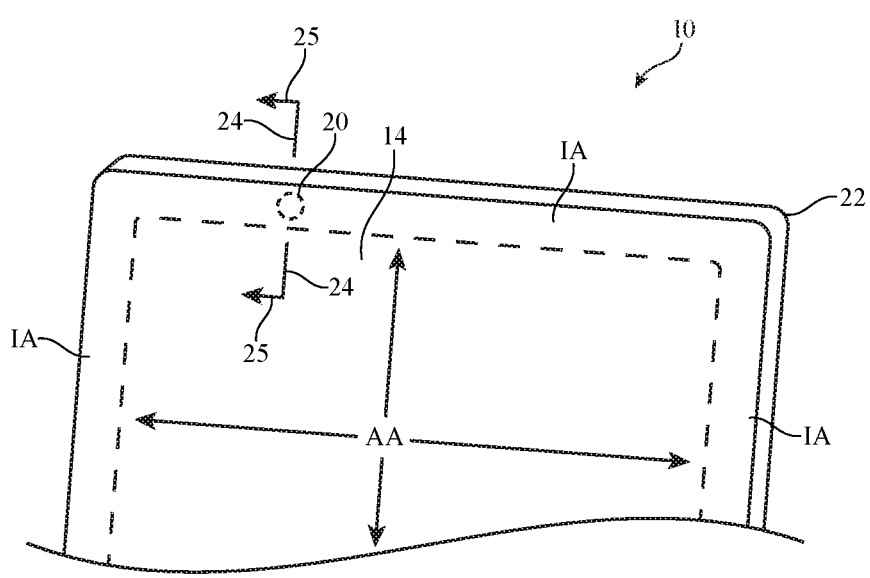
FIG. 2 is a perspective view of a portion of an electronic device display within which an ambient light sensor has been mounted in accordance with an embodiment.

A perspective view of a portion of an illustrative electronic device is shown in FIG. 2. In the example of FIG. 2, device 10 includes a display such as display 14 mounted in housing 22. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer. Openings may be formed in the display cover layer. For example, an opening may be formed in the display cover layer to accommodate a button, a speaker port, or other components. Openings may be formed in housing 22 to form communications ports (e.g., an audio jack port, a digital data port, etc.), to form openings for buttons, etc.

Display 14 may include an array of display pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies. The array of pixels of display 14 forms an active area AA. Active area AA is used to display images for a user of device 10. Active area AA may be rectangular or may have other suitable shapes. Inactive border area IA may run along one or more edges of active area AA. Inactive border area IA may contain circuits, signal lines, and other structures that do not emit light for forming images. To hide inactive circuitry and other components in border area IA from view by a user of device 10, the underside of the outermost layer of display 14 (e.g., the display cover layer or other display layer) may be coated with an opaque masking material such as a layer of black ink. Optical components (e.g., a camera, a light-based proximity sensor, an ambient light sensor, status indicator light-emitting diodes, camera flash light-emitting diodes, etc.) may be mounted under inactive border area IA. One or more openings (sometimes referred to as windows) may be formed in the opaque masking layer of IA to accommodate the optical components. For example, a light component window such as an ambient light sensor window may be formed in a peripheral portion of display 14 such as region 20 in inactive border area IA. Ambient light from the exterior of device 10 may be measured by an ambient light sensor in device 10 after passing through region 20 and the display cover layer.

Figure 3:
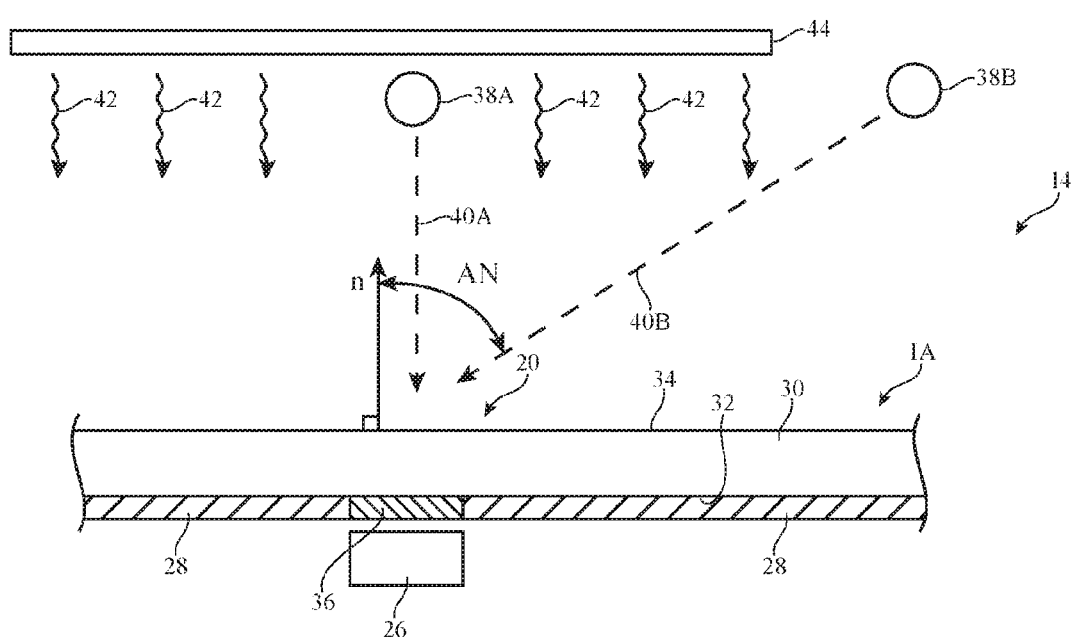
FIG. 3 is a cross-sectional side view of an illustrative light sensor that is being exposed to different types of ambient lighting conditions in accordance with an embodiment.

FIG. 3 is a cross-sectional side view of display 14 of FIG. 2 taken along line 24 and viewed in direction 25 of FIG. 2. As shown in FIG. 3, light sensor 26 may be mounted in alignment with window 20. Light sensor 26 may be an ambient light sensor that is used in measuring ambient light from diffuse and directional (non-diffuse) light sources. In the example of FIG. 3, light source 44 is a diffuse light source that produces diffuse ambient light 42. Display cover layer 30 has an outer surface such as surface 34. Surface normal n is perpendicular to surface 34. Directional light source 38A produces directional light 40A. Light 40A is oriented at an angle of incidence AN of 0° with respect to surface normal n. Illustrative directional light source 38B produces directional light 40B that has an angle of incidence AN of about 50° with respect to surface normal n. In general, device 10 and display 14 may be illuminated by ambient light from one or more diffuse light sources and/or one or more directional light sources. The example of FIG. 3 is merely illustrative.

Window 20 may be formed from an opening in opaque masking layer 28 on inner surface 32 of display cover layer 30 in inactive area IA. Layer 30 may be formed from glass, plastic, ceramic, sapphire, or other transparent materials and may be a part of display 14 or a separate protective layer that covers active display structures. The opening associated with window 20 may be filled with window material 36. Window material 36 may be material that is transparent to some or all of the visible light spectrum. For example, window material 36 may be filled from a clear or translucent polymer or other transparent material. Window material 36 may, if desired, include diffuser material and/or material that forms a Fresnel lens or other light directing features that help guide diffuse light 42 and directional light 40A and 40B to light sensor 26.

Figure 4:
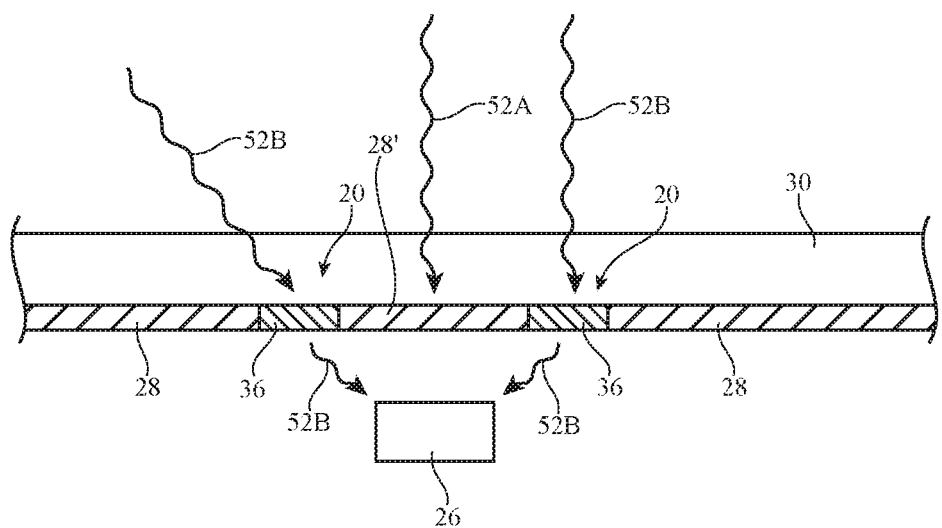
FIG. 4 is a cross-sectional side view of an illustrative light sensor mounted under a ring-shaped sensor window accordance with an embodiment.

If desired, window 20 may have the shape of a ring. For example, window 20 may be formed from a circular ring-shaped opening in opaque masking layer 28, as shown in FIG. 4. Window material 36 may include translucent material that helps scatter ambient light into ambient light sensor 26. Ambient light sensor 26 may be mounted under central circular opaque masking layer portion 28'. With this type of arrangement, some ambient light rays such as light ray 52A that would have been directly incident on sensor 26 will be blocked. Other light rays such as light rays 52B may be scattered or otherwise redirected so that they reach sensor 26. An arrangement of the type shown in FIG. 4 may be used to help make sensor 26 sensitive to the presence of diffuse light and prevents oversensitivity to the presence or absence of on-axis directional light.

Ambient light sensor 26 may be a directional ambient light sensor that has the ability to identify the angle of incidence AN of incoming light rays. Incident light directionality information may be used alone or in combination with other sensor data in controlling the brightness of display 14, in adjusting the shading (shadow shading) of items presented on the display and adjusting other effects on display 14 (e.g., to shade icons in correspondence with the direction of ambient light on display 14 so that the shaded icons have shadow features associated with a user's ambient environment), to adjust the texture of items presented on the display (e.g., so that items appear to have a texture appropriate for the current lighting conditions), in adjusting the color of items presented on display 14, in determining how device 10 is being used (e.g., whether display 14 is indoors or outdoors, etc.), or in performing other functions involved in operating device 10.

Figure 5:
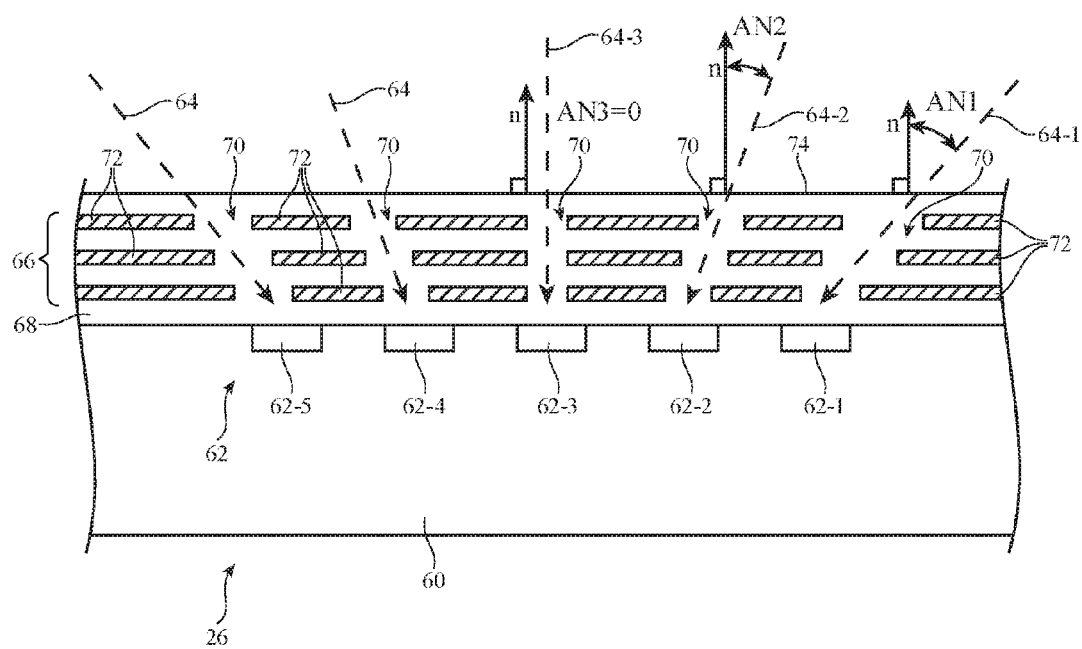
FIG. 5 is a cross-sectional side view of an illustrative light sensor with directional measurement capabilities in accordance with an embodiment.

A cross-sectional side view of an illustrative directional ambient light sensor is shown in FIG. 5. As shown in FIG. 5, ambient light sensor 26 may be formed from a semiconductor substrate such as substrate 60 (e.g., a silicon substrate, etc.). An array of light sensors such as light detectors 62 may be formed on the surface of substrate 60. Detectors 62 may be phototransistors, photodiodes, or other photodetectors capable of detecting incoming light 64. In the example of FIG. 5, there are five light detectors 62-1, 62-2, 62-3, 62-4, and 62-5 and the light detectors are organized in a linear array (extending from left to right along the surface of substrate 60 in the orientation of FIG. 5). This is merely illustrative. There may be two or more light detectors 62, three or more light detectors 62, five or more light detectors 62, seven or more light detectors 62, 2-10 light detectors 62, 5-20 light detectors 62, or other suitable number of light detectors 62. Light detectors may be organized in a linear array, in a two dimensional array, in a cross-pattern (i.e., a pattern in which two linear arrays are aligned at right angles to each other), a circle, or other suitable pattern.

Incident light angle restriction structures 66 may be formed on top of substrate 60 and light detectors 62. Structures 66 may be formed from opaque layers (e.g., layers of black photoresist, layers of metal, or other light blocking materials) and/or transparent layers (e.g., clear polymer layers, etc.). If desired, structures 66 may be used to form a lens array in which each lens accepts light coming from a different direction. In the example of FIG. 5, structures 66 include supporting material 68 (e.g., clear polymer) and embedded patterned metal layers 72. Patterned metal layers 72 contain openings (e.g., rectangular holes, circular holes, or openings with other outlines). The openings are aligned to form openings such as channels 70 with different angular orientations with respect to surface normal n (a vector that is perpendicular to upper surface 74 of the layers of sensor 26 such as structures 66 and the surface of substrate 60). Each channel terminates at a respective one of light detectors 62. This allows each light detector 62 to serve as a separate channel in sensor 26.

Each channel is associated with incoming light of a different angular orientation (i.e., a different range of angles of incidence). For example, the light channel that is associated with light sensor 62-1 allows light sensor 62-1 to detect light such as incident light ray 64-1 that is oriented at angle AN1 with respect to surface normal n. A channel 70 that is oriented along a different path allows light sensor 62-2 to detect light such as incident light ray 64-2 that is oriented at angle AN2 with respect to surface normal n. Light 64-3 that is incident at angle AN3 (e.g., 0°) with respect to surface normal n is allowed to pass to light detector 62-3, etc. As this example demonstrates, each channel of directional ambient light sensor 26 of FIG. 5 detects light that is oriented with a different angle with respect to light sensor 26. This information can be processed to produce an intensity versus angle of incidence curve for ambient light.

Figure 6:
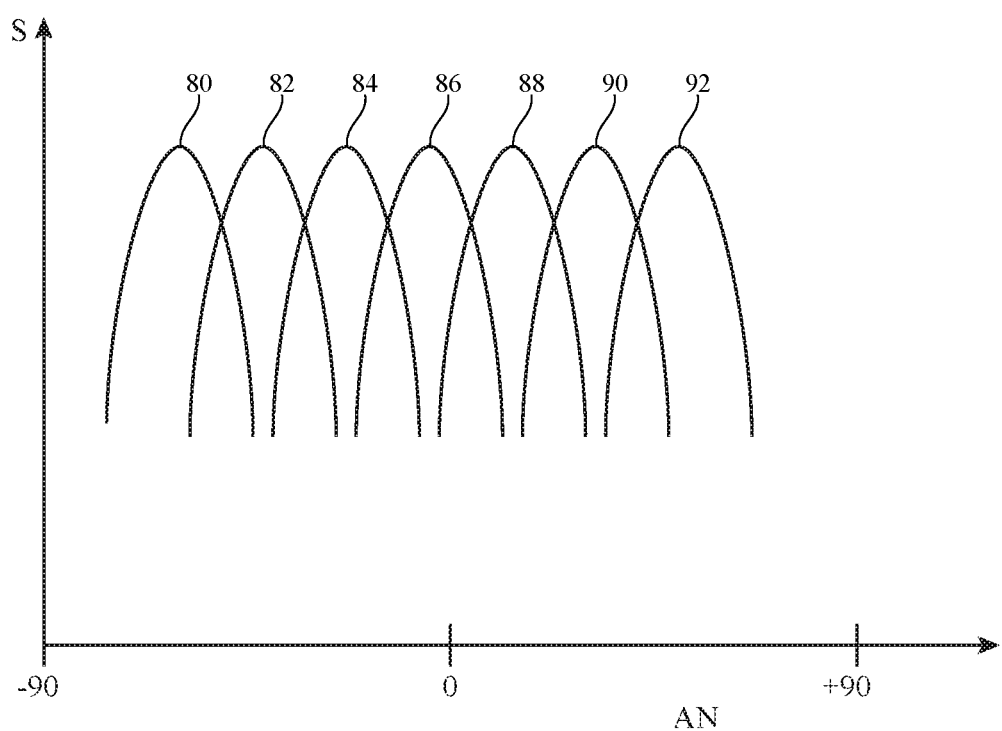
FIG. 6 is a graph in which sensor response has been plotted as a function of incident light angle for a multichannel ambient light sensor in accordance with an embodiment.

The angular sensitivity profiles of each channel of directional ambient light sensor 26 may overlap (i.e., the edges of the ranges of angles of incidence covered by adjacent sensors may overlap), as shown in FIG. 6.

As illustrated by the detector sensitivity curves of FIG. 6, sensor 26 may have a number of independent channels, each of which has a corresponding response (curves 80, 82, 84, 86, 88, 90, and 92) that varies as a function of incident light angle. In the example of FIG. 6, sensor 26 has seven channels each of which exhibits a peak in sensitivity S at a different respective angle AN with respect to surface normal n. Directional sensors with more channels or fewer channels and/or channels that detect light at different angles may also be used. Because the sensitivity curves of the light detectors 62 in light sensor 26 overlap with each other (i.e., because each sensor channel has a slightly shifted angle-dependent sensitivity), the ability for accurate intensity angular profile information to be extracted from the sensor data may be enhanced. An illustrative extracted intensity profile (curve 94) is shown in FIG. 7.

Figure 7:
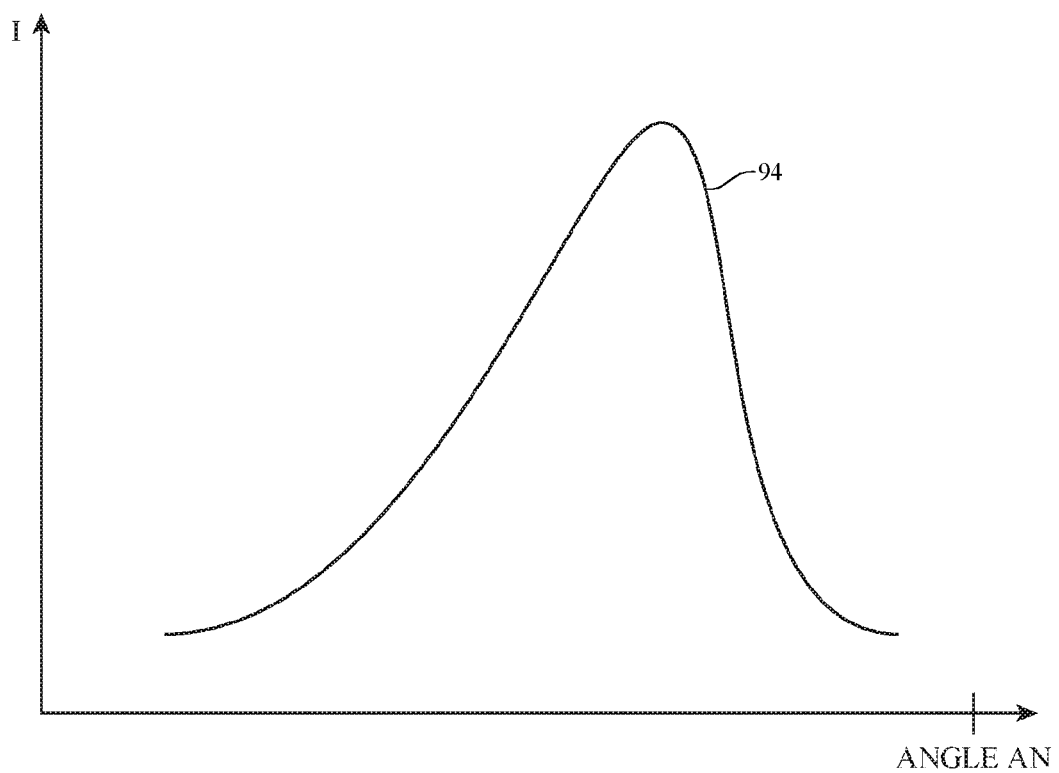
FIG. 7 is a graph in which an illustrative measured light intensity has been plotted as a function of incident light angle in accordance with an embodiment.

Intensity profiles such as illustrative intensity profile 94 of FIG. 7 (e.g., intensity versus angle curves for incident light) may be extracted by processing data from each of the overlapping channels of sensor 26. The intensity profile data can be used by device 10 to determine the direction from which incoming light is illuminating device 10 and will quantify how directive (narrow or wide) the light is.

A mathematical inversion algorithm may be used to produce intensity profile 94 from incoming light measured using an array of light detectors 62 with partially overlapping sensitivity profiles of the type shown in FIG. 6. Consider, as an example, a scenario in which light sensor 26 has seven channels. Each channel has a main receiving direction and adjacent channels have partially overlapping receiving directions, as illustrated by the sensitivity curves of FIG. 6. The response of this type of directional ambient light sensor may be described using equation 1:

$$b = Ax \quad (1)$$

In equation 1, b represents the ambient light readings from the 7 channels, incoming light has an intensity profile x, and A represents the response functions for all 7 channels of sensor 26. The variable b is a 7×1 array (in this example). In an illustrative configuration in which x covers an angular range from −60 to +60 degrees from surface normal n with a two degree resolution, x is a 60×1 array. Response function matrix A is a 7×60 array representing the response functions of the angular light detectors in sensor 26.

The entries in matrix A are determined by making calibration measurements on sensor 26. The values of b are gathered by making readings from all 7 channels in the sensor. Intensity profile x can be calculated from A and b.

The calculation of x from A and b is, in general, an ill-posed problem because the number of unknowns that is to be calculated is greater than the number of knowns. Control circuitry 12 may solve for x using a matrix inversion technique suitable for ill-posed problems. With one illustrative arrangement, the pseudo-inverse method may be used. With another suitable arrangement Tikhonov regularization may be used. With yet another suitable arrangement, an optimization algorithm may be used to minimize the difference between Ax and b (e.g., using a sequential least squares programming technique or other optimization technique). Using techniques such as these or other inversion techniques, light intensity profile 94 may be determined to a higher angular resolution than the width of the response functions of each channel. For example, an angular resolution of 5 degrees may be achieved where each channel has an angular range of greater than 10° or greater than 20° (as examples).

Figure 8:
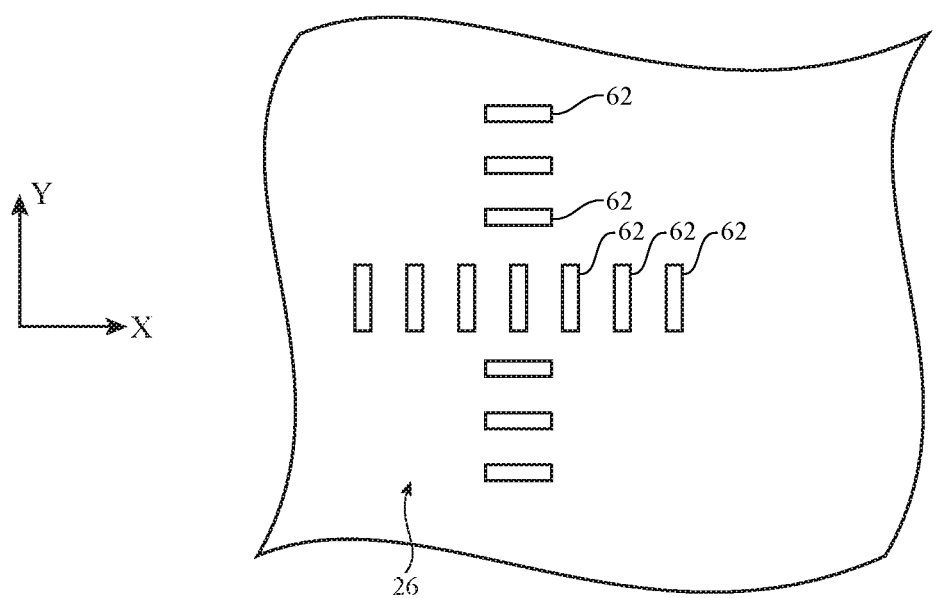
FIG. 8 is a top view of an illustrative light sensor having directional measurement capabilities in accordance with an embodiment.

As shown in FIG. 8, light sensor 26 may, if desired, be formed from a pair of orthogonal linear arrays of light detectors 62. One set of light detectors 62 may extend in a line along horizontal dimension X and another set of light detectors 62 may extend along perpendicular dimension Y. The set of light detectors 62 that extend along dimension X may measure how much incoming light is angled along the X dimension and the set of light detectors 62 that extends along the Y dimension may measure incoming light orientation with respect to the Y dimension.

If desired, ambient light sensor 26 may have channels that are sensitive to different amounts of angular light spread but which may (as an example) be oriented in the same direction. For example, ambient light sensor 26 may have a sensor with a wide angular acceptance characteristic that is used for measuring diffuse light and a sensor with a narrow angular acceptance characteristic that is used for measuring directional light. In general, there may be one or more of the wider angular acceptance detectors and one or more of the narrower angular acceptance detectors. The detectors may be oriented in different directions and/or some or all of the wide angle and narrow angle detectors may be oriented in the same direction(s).

Figure 9:
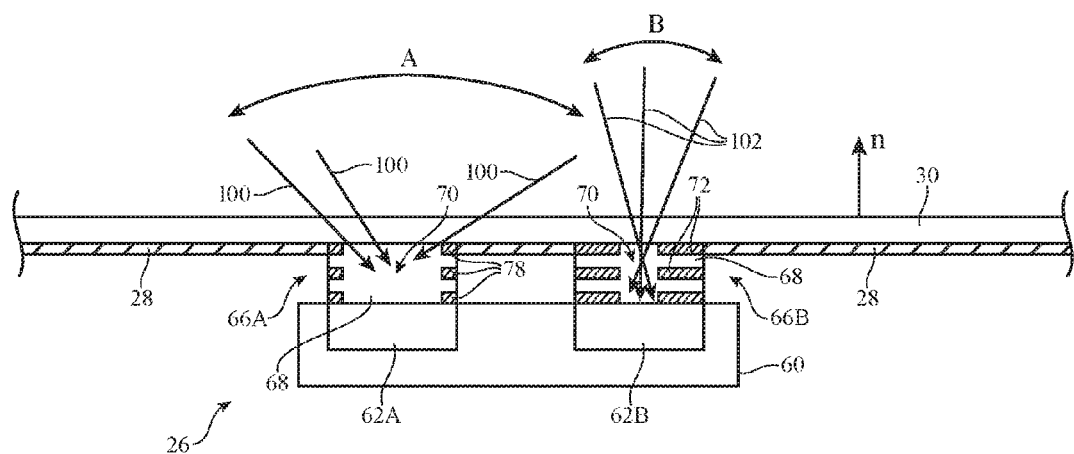
FIG. 9 is a cross-sectional side view of an illustrative light sensor with an element that measures diffuse light and an element that measures on-axis directional light in accordance with an embodiment.
Figure 10:
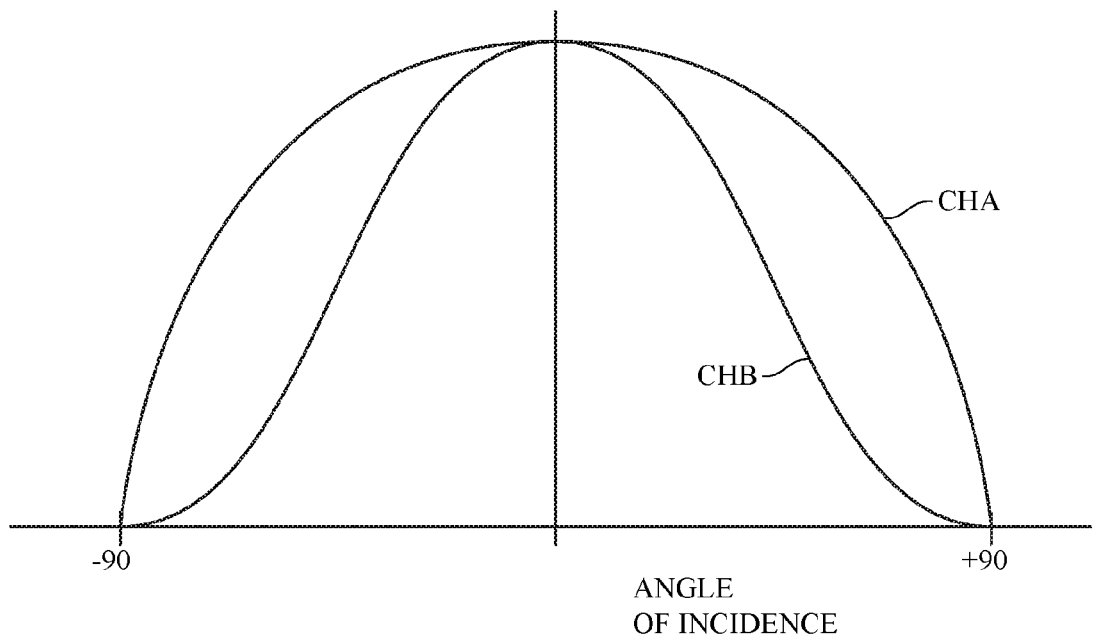
FIG. 10 is a graph in which the sensitivities of the diffuse light measurement element and on-axis directional light element of FIG. 9 have been plotted as a function of incident light angle in accordance with an embodiment.

With one illustrative configuration, which is sometimes described herein as an example, ambient light sensor has first and second light detectors. The first light detector measures diffuse light and the second light detector measures directional light. This type of configuration is shown in FIG. 9. As shown in FIG. 9, directional light sensor 26 may have a first light detector such as light detector 62A and a second light detector such as light detector 62B. Light detectors 62A and 62B may be solid state light detectors that are formed from a common semiconductor substrate such as substrate 60 or may be formed from separate semiconductor die. Incident light angle restriction structures 66B may be formed on substrate 60 in alignment with detector 62B. Structures 66A (on detector 62A) and 66B (on detector 62B) may be formed from lenses, opaque materials such as patterned metal layers 72 or other opaque materials, transparent materials (e.g., transparent material 68), or other structures that define light passage openings such as channels 70. Each of channels 70 allows light of a predefined angular spread and predefined orientation to be passed to a corresponding light detector. For example, the diffuse and narrow angle of incidence detectors of FIG. 9 may have channels 70 with an orientation parallel to surface normal n so that the direction of peak sensitivity is the same for each channel.

In the illustrative arrangement of FIG. 9, structures 66B define a light passage opening 70 with a relatively narrow angle of acceptance such as angle of acceptance B so detector 62B is able to measure incoming light 102 in a relatively narrow range of angles. Structures 66A define a light passage opening with a relatively wide angle of acceptance such as angle of acceptance A so that detector 62A is able to measure incoming light 100 from a relatively wide range of angles. If desired, opening 70 in structures 66A may be formed from ring-shaped openings in metal layers 78. With this type of configuration, a central opaque metal structure (or a central opaque portion of opaque layer 28 such as portion 28' of FIG. 4) may block on-axis light for detector 62B, thereby enhancing the ability of detector 62B to respond to diffuse light (rather than non-diffuse light). Using arrangements such as these, detector 62A may produce a signal that is responsive to the presence of diffuse light 100 and detector 62B may produce a signal that is responsive to the presence of directional light 102.

Device 10 can use readings from the sensor channel associated with detector 62B (channel B) and the sensor channel associated with detector 62A (channel A) to determine whether incident light is diffuse or directional in nature. For example, device 10 can compute the ratio R=(Channel A−Channel B)/(Channel A), where the diffuse channel reading (Channel A) is obtained from detector 62A and the directional channel reading (Channel B) is obtained from detector 62B. The ratio R can be used as a diffusivity parameter that indicates the degree to which ambient light is diffuse or not diffuse. When R is high, device 10 can take actions appropriate for diffuse lighting conditions. When R is low, device 10 can take actions appropriate for directional (non-diffuse) lighting conditions.

Figure 11:
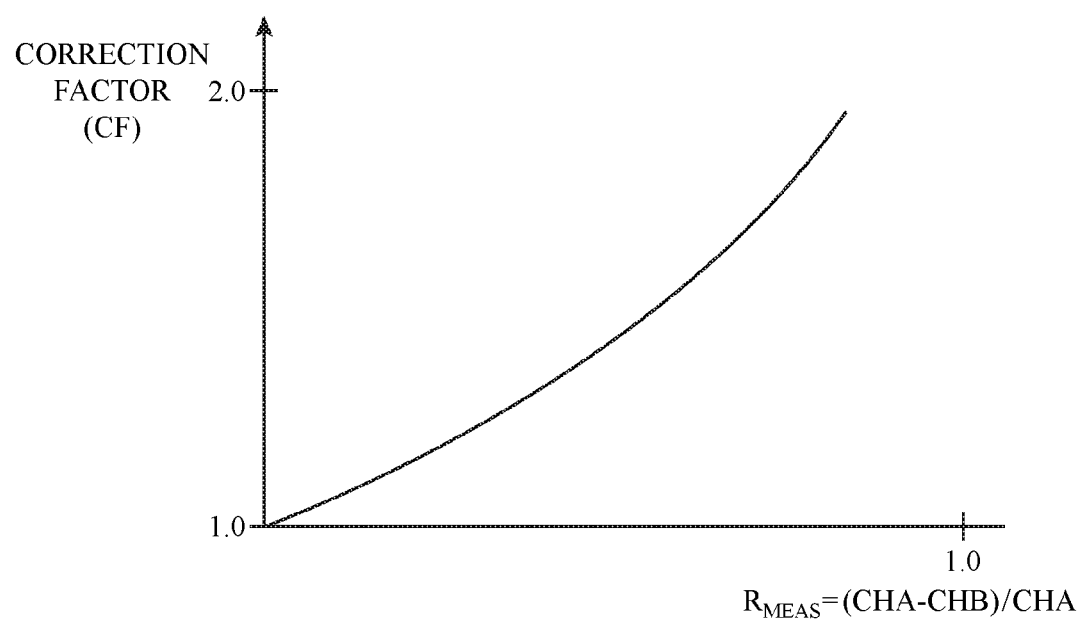
FIG. 11 is a graph in which an illustrative angle-dependent light sensor correction factor has been plotted as a function of incident light angle in accordance with an embodiment.

Raw readings of ratio R from ambient light readings for sensor 26 of FIG. 9 may be calibrated using a calibration curve of the type shown in FIG. 11. The calibration curve of FIG. 11 compensates for deviations in sensor response for a sensor of the type shown in FIG. 9 from the ideal expected response of an on-axis ambient light sensor. A look-up table or other system may be used to store the values of correction factor CF for various values of the raw measured version of R (Rmeas). For a given value of Rmeas, a corresponding corrected value of R (Rcor) may be computed by multiplying Rmeas by CF. If desired, the uncorrected value of R or values of R that are adjusted using other schemes may also be used by device 10. The calibration curve of FIG. 11 is merely illustrative.

Figure 12:
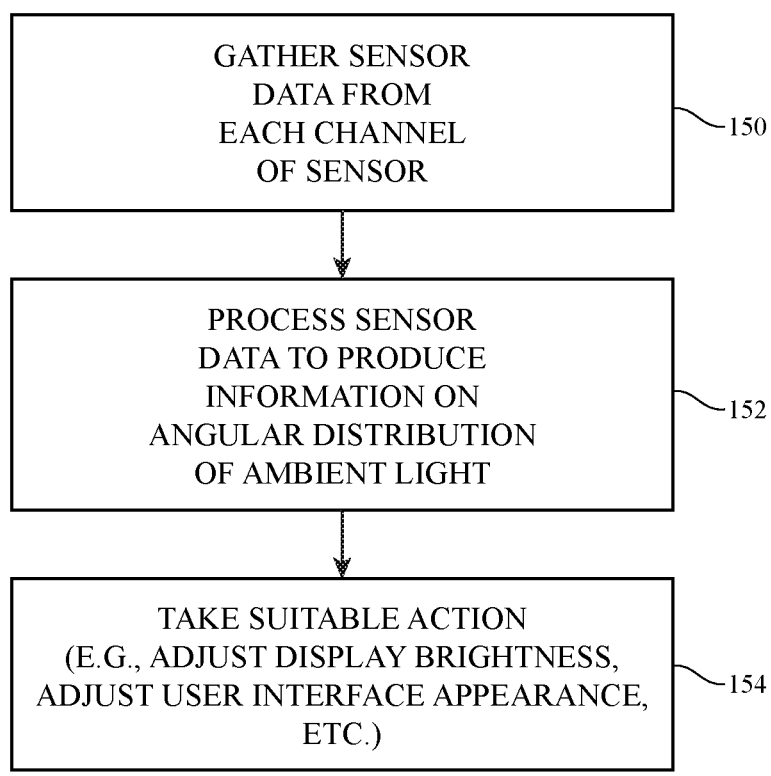
FIG. 12 is a flow chart of illustrative steps involved in operating an electronic device with a directional light sensor in accordance with an embodiment.

A flow chart of illustrative steps involved in using information from a directional ambient light sensor to operate device 10 is shown in FIG. 12.

At step 150, ambient light sensor data may be gathered from the ambient light sensor by control circuitry 16. The ambient light sensor from which the data is gathered may be a light sensor such as light sensor 26 of FIG. 5 that has an array of light detectors 62 that extend along a single axis, may be a light sensor such as light sensor 26 of FIG. 8 or other directional light sensor that has a two-dimensional array of light detectors 62 for detecting incident light directions with respect to two different axes (X and Y), may be an ambient light sensor such as light sensor 26 of FIG. 9 that supplies an output signal (e.g., ratio R) indicative of the degree to which ambient light in the vicinity of device 10 is diffuse (i.e., a diffuse light reading), or may be any other suitable directional ambient light sensor.

At step 152, the sensor data from sensor 26 is processed by control circuitry 16 (e.g., to apply a correction factor such as correction factor CF, to compute diffusivity value R, to determine an incident light intensity versus angle profile of the type shown by curve 94 of FIG. 7, or to otherwise produce directional ambient light data.

At step 154, device 10 may use control circuitry 16 to take a suitable action such as adjusting a display brightness setting for display 14, adjusting the appearance of items displayed on display 14 (e.g., icon shading and texture, shading and texture for other items on display 14, etc.), taking other actions to adjust the operation of device 10, etc.

The foregoing is merely illustrative and various modifications can be made by those skilled in the art without departing from the scope and spirit of the described embodiments. The foregoing embodiments may be implemented individually or in any combination.

What is claimed is:

1. An electronic device that is exposed to ambient light characterized by a range of angles of incidence, comprising:
    a housing;
    control circuitry in the housing; and
    a directional ambient light sensor in the housing with which the control circuitry measures an ambient light intensity versus angle of incidence profile for the ambient light, wherein the directional ambient light sensor comprises a plurality of light detectors with partially overlapping angle of incidence sensitivity profiles.

2. The electronic device defined in claim 1 wherein each light detector has a peak sensitivity for measuring ambient light at a different angle of incidence.

3. The electronic device defined in claim 2 further comprising a display in the housing, wherein the display has an active area and an inactive border and wherein the directional ambient light sensor is mounted under a window region in the inactive border.

4. The electronic device defined in claim 3 wherein the light detectors include a first set of light detectors that extend along a first dimension and a second set of light detectors that extend along a second dimension that is orthogonal to the first dimension.

5. The electronic device defined in claim 4 wherein the light detectors are formed from a common semiconductor substrate having a surface characterized by a surface normal and wherein incident light angle restriction structures are formed on the surface.

6. The electronic device defined in claim 5 wherein the incident light angle restriction structures form a plurality of channels each associated with a respective one of the light detectors, each channel being oriented to allow ambient light to pass that has a different respective angle of incidence with respect to the surface normal.

7. The electronic device defined in claim 6 wherein each light detector and associated channel in the incident light angle restriction structures corresponds to a sensor channel with an angular sensitivity profile and wherein the angular sensitivity profile of each channel at least partly overlaps the angular sensitivity profile of an adjacent one of the channels.

8. The electronic device defined in claim 1 further comprising a display having a surface normal, wherein the light detectors are formed on a common semiconductor substrate and wherein each light detector is configured to measure incident light with a different respective range of angles with respect to the surface normal.

9. The electronic device defined in claim 1 wherein the electronic device includes a display and wherein the control circuitry takes an action at least partly in response to the measured ambient light intensity versus angle of incidence profile and wherein the action is selected from the group consisting of: adjusting brightness for the display, adjusting color for items presented on the display, adjusting texture for items presented on the display, and adjusting shading for items presented on the display.

10. An electronic device, comprising:
    a housing;
    control circuitry in the housing; and
    an ambient light sensor in the housing with which the control circuitry measures ambient light, wherein the ambient light sensor includes a diffuse light ambient light detector that measures diffuse ambient light with a first angle of incidence range and a directional light ambient light detector that measures directional ambient light with a second angle of incidence range that at least partially overlaps the first angle of incidence range.

11. The electronic device defined in claim 10 wherein the second angle of incidence range is smaller than the first angle of incidence range.

12. The electronic device defined in claim 11 wherein the control circuitry produces a diffuse light reading by processing a diffuse light measurement from the diffuse light ambient light detector and a directional light measurement from the directional ambient light detector.

13. The electronic device defined in claim 12 wherein the electronic device includes a display and wherein the control circuitry renders electronic content on the display in response to the diffuse light reading.

14. The electronic device defined in claim 13 wherein the electronic device includes a display and wherein the control circuitry takes an action in response to the diffuse light reading that is selected from the group consisting of: adjusting brightness for the display, adjusting texture for items presented on the display, adjusting color for items presented on the display, and adjusting shading for items presented on the display.

15. The electronic device defined in claim 13 wherein the diffuse light ambient light detector and the directional light ambient light detector are formed from a common semiconductor substrate.

16. The electronic device defined in claim 15 wherein the ambient light sensor includes multiple layers of metal with openings that allow light to pass to the diffuse light ambient light detector and the directional light ambient light detector.

17. An electronic device, comprising:
    a housing;
    a display in the housing;

an ambient light sensor that measures ambient light, wherein the ambient light sensor comprises:
  a semiconductor substrate in which a plurality of light detectors are formed; and
  incident light angle restriction structures on the semiconductor substrate, wherein the incident light angle restriction structures have openings, each opening accepting ambient light over a different respective range of incident light angles, each opening being aligned with a respective one of the plurality of light detectors, and the range of incident light angles accepted by one of the openings being at least partially overlapping with the range of incident light angles accepted by another one of the openings.

18. The electronic device defined in claim 17 wherein the display has an active area bordered by an inactive area and has a window region in the inactive area that is aligned with the ambient light sensor.

19. The electronic device defined in claim 18 wherein the light detectors include a first set of light detectors arranged along a first axis and a second set of light detectors arranged along a second axis that is not parallel to the first axis.

20. The electronic device defined in claim 18 wherein each of the light detectors measures incident light over a respective range of incident light angles and wherein the range of incident light angles measured by each light detector partially overlaps the range of incident light angles for an adjacent one of the light detector.

21. The electronic device defined in claim 20 wherein the incident light angle restriction structures include patterned metal layers with holes that form the openings.

\* \* \* \* \*